US008150331B2

(12) United States Patent
Depta

(10) Patent No.: US 8,150,331 B2
(45) Date of Patent: Apr. 3, 2012

(54) METHOD FOR ADAPTING THE SIGNAL TRANSMISSION BETWEEN TWO ELECTRONIC DEVICES, AS WELL AS ARRANGEMENT WITH A COMPUTER SYSTEM AND A PERIPHERAL DEVICE

(75) Inventor: Robert Depta, Augsburg (DE)

(73) Assignee: Fujitsu Technology Solutions Intellectual Property GmbH, München (DE)

(*) Notice: Subject to any disclaimer, the term of this patent is extended or adjusted under 35 U.S.C. 154(b) by 100 days.

(21) Appl. No.: 12/816,361

(22) Filed: Jun. 15, 2010

(65) Prior Publication Data

US 2010/0323623 A1 Dec. 23, 2010

(30) Foreign Application Priority Data

Jun. 17, 2009 (DE) .......................... 10 2009 025 259

(51) Int. Cl.
*H04B 1/00* (2006.01)
*H04B 7/00* (2006.01)
(52) U.S. Cl. ......... 455/69; 455/423; 455/425; 455/63.1; 455/67.11; 455/67.13; 455/67.14; 455/67.15; 455/68; 455/114.2; 455/115.1; 455/226.1; 324/750.26; 324/750.27; 324/762.01; 324/762.06; 324/538; 324/539; 324/522; 324/527; 324/530; 324/754.27; 324/754.31
(58) Field of Classification Search .......... 455/423–425, 455/63.1, 67.11, 67.13, 67.14, 67.15, 67.16, 455/68, 69, 114.2, 115.1–115.4, 226.1–226.4, 455/296; 324/537, 750.01, 750.15, 750.26, 324/750.27, 754.01, 754.02, 754.03, 754.04, 324/762.01, 762.06, 538, 539, 543, 522, 324/523, 527, 530, 754.27, 754.31
See application file for complete search history.

(56) References Cited

U.S. PATENT DOCUMENTS

| 5,751,153 | A  | * | 5/1998  | Bockelman  | 324/638 |
|-----------|----|---|---------|------------|---------|
| 6,541,993 | B2 | * | 4/2003  | Laureanti  | 324/762.09 |
| 6,650,123 | B2 | * | 11/2003 | Martens    | 324/601 |
| 6,982,561 | B2 | * | 1/2006  | Scott      | 324/638 |
| 7,170,300 | B2 | * | 1/2007  | Kahng et al. | 324/638 |

(Continued)

FOREIGN PATENT DOCUMENTS

DE     10 2007 010 284     9/2008

*Primary Examiner* — Tuan A Tran
(74) *Attorney, Agent, or Firm* — Cozen O'Connor

(57) ABSTRACT

A method for adapting the signal transmission between two electronic devices (1, 2) that are connected to each other via a physical interface and that each have a transmitter (8a, 8b) and a receiver (7a, 7b), wherein analog signals are transmitted from the transmitter (8a, 8b) of one device (1, 2) along a transmission path (9a, 9b) to the receiver (7a, 7b) of the other device (1, 2). Known scattering parameters (10a, 10b, 10c, 11d) for describing the electromagnetic wave propagation in the transmission path (9a, 9b) between the receiver (7a, 7b) of the first device (1, 2) and the transmitter (8a, 8b) of the second device (1, 2) are retrieved by the first device (1, 2), transmitted to the second device (1, 2), and parameters of the transmitter (8a, 8b) in the second device (1, 2) are adapted with reference to a high-frequency description of the transmission path (9a, 9b) as a function of all of the scattering parameters (10a to 10d, 11a to 11d) known to the two devices. Furthermore, an arrangement with a computer system and a peripheral device is described that is designed to carry out a corresponding method.

15 Claims, 2 Drawing Sheets

U.S. PATENT DOCUMENTS

| | | |
|---|---|---|
| 7,809,216 B2 * | 10/2010 | Cox, III .......................... 385/2 |
| 2005/0240361 A1 | 10/2005 | Loyer |
| 2006/0237705 A1 | 10/2006 | Kuo et al. |
| 2007/0197169 A1 * | 8/2007 | Viss .......................... 455/67.14 |
| 2008/0215905 A1 | 9/2008 | Mueller et al. |
| 2008/0227410 A1 * | 9/2008 | Cox ............................... 455/82 |
| 2010/0273429 A1 * | 10/2010 | Tiemeijer .................. 455/67.11 |

\* cited by examiner

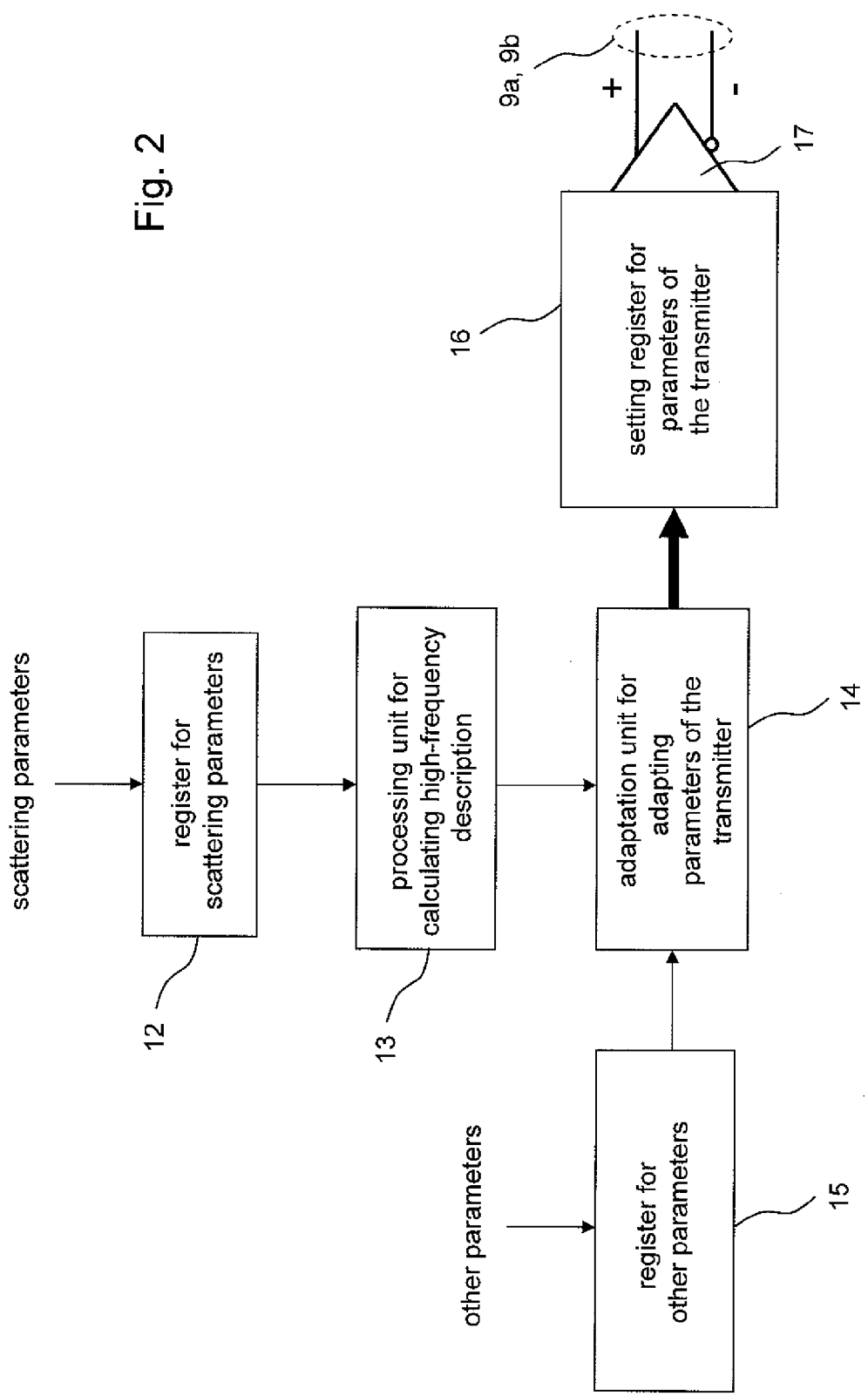

METHOD FOR ADAPTING THE SIGNAL TRANSMISSION BETWEEN TWO ELECTRONIC DEVICES, AS WELL AS ARRANGEMENT WITH A COMPUTER SYSTEM AND A PERIPHERAL DEVICE

RELATED APPLICATION

This application claims the priority of German patent application 10 2009 025 259.2 filed Jun. 17, 2009, the entire content of which is hereby incorporated by reference.

FIELD OF THE INVENTION

The invention relates to a method for adapting the signal transmission between two electronic devices that are connected to each other via a physical interface and that each have a transmitter and a receiver, wherein signals are transmitted from the transmitter of one device along a transmission path to the receiver of the other device.

The invention further relates to an arrangement with a computer system and a peripheral device, wherein the peripheral device is connected to the computer system via a physical interface, and wherein the computer system and the peripheral device each have a transmitter and a receiver for transmitting signals between the computer system and the peripheral device.

BACKGROUND OF THE INVENTION

In computer systems, two components or devices, for example, a motherboard and an internal hard disk or an external peripheral device, are connected to each other by means of physical interfaces, in order to be able to exchange data with each other. Common interfaces are, for example, the Universal Serial Bus (USB), the Small Computer System Interface (SCSI), the Serial Attached SCSI (SAS), the Serial Advanced Technology Attachment (SATA), or the Fiber Channel (FC). The transmission properties, such as, for example, the transmission rate, format and contents of individual data packets, or the addressing and communication of connected devices with each other are fixed in an associated transmission protocol for each interface.

A physical interface consists of cables, electrical conductors, and plug connections between the individual devices. The data and information are transmitted between the devices by means of analog signals that are modulated, for example, in their amplitude, in order to code digital information of individual bits. For example, a low level corresponds to the logical value "0" and a high level corresponds to the logical value "1". Here, each device has a transmitter and also a receiver, which transmit and receive, respectively, analog signals by means of the interface in accordance with the protocol. The transmitter and receiver are here special circuits or integrated components (ICs), wherein the transmitter and receiver are often described together in one device as a so-called transceiver (transmitter and receiver). The individual circuits of the transmitter and receiver are also designated as transmitter-PHY or receiver-PHY on the basis of their task in the physical signal transmission.

A physical interface with its transmission path made from plugs, lines, and strip conductors on circuit boards influences the signal transmission between a transmitter and a receiver of two devices. Due to high-frequency scattering and electromagnetic interference, the transmitted signal is changed and distorted during the transmission on the physical interface. The properties of the transmitted signal, however, are fixed once according to the transmission protocol and are no longer changed. For error-free signal transmission, the interface is usually calibrated, as is generally known from the publication DE 10 2007 010 284 A1.

Furthermore, solutions exist for adapting the parameters of a receiver to the specification requirements according to the specified transmission protocol or for regulating the signal amplitude according to the settings of a receiver. For example, after receiving analog signals, a receiver can report to a transmitter whether the latter should increase or decrease the signal amplitude. All of these solutions, however, have the disadvantage that later adaptation or setting of a receiver or the signal amplitude allows only a limited improvement of the signal transmission.

SUMMARY OF THE INVENTION

Therefore, it is an object of the invention to describe a method and also an arrangement of the type named above, with this method and arrangement allowing improved adaptation of the signal transmission between two electronic devices.

In a first aspect, the problem is solved by a method of the type named above comprising the following steps:

retrieval by the first device of scattering parameters known to the first device for describing the electromagnetic wave propagation in the transmission path between the receiver of the first device and the transmitter of the second device, transmission of the scattering parameters to the second device, determination of a high-frequency description of the transmission path between the receiver of the first device and the transmitter of the second device as a function of all of the scattering parameters known to the two devices by the second device, and adaptation of parameters of the transmitter in the second device as a function of the high-frequency description of the transmission path.

Such a method allows a precise and complete detection of the properties of the transmission path for the transmitter of a device, so that signal properties can be adapted to the physical conditions of the interface in order to guarantee optimum signal transmission. Here, the parameters of the transmitter are set individually to the best possible values for a corresponding transmission path of the physical interface between two electronic devices. It is then conceivable to also adapt the receiver according to the received signal.

The scattering parameters, also called S-parameters, are here, in general, a measure for the transmission and reflection of electromagnetic waves in electrical two-terminal pair networks with one input and one output and mirror the change in power of high-frequency signals when passing through the electrical two-terminal pair network. The scattering parameters therefore represent an effective description possibility with respect to the influence of high-frequency signals in plugs, lines, and also strip conductors of a physical interface between the transmitters and receivers of two devices. Under the use of all of the scattering parameters, a total high-frequency path description of the transmission path between two devices can be formed. Parameters of a transmitter are adapted such that the transmission path of a physical interface has the smallest possible influence on the transmitted signal. A receiver thus obtains a signal that best satisfies the specification requirements.

Advantageously, the scattering parameters known in the first device are transmitted to the second device at the lowest transmission rate of the interface. In this way it is guaranteed that both devices operate without errors and thus scattering parameters can be transmitted to the second device without errors. The second device thus can calculate an exact high-frequency description of the total transmission path.

The adaptation of parameters of the transmitter in the second device is preferably performed separately for all of the transmission rates of the interface. This has the advantage that a speed-dependent influence of the signal transmission can be likewise reduced by the physical interface. The transmitter is here optimally adapted in all of the operating modes, for example, a low-speed mode or a high-speed mode.

Preferably, the previously mentioned method is performed not only for the transmitter in the second device, but also for the transmitter in the first device. This means that not only the transmitter of the second device, but also the transmitter of the first device, can be adapted to the transmission path of the physical interface with reference to a complete high-frequency description. Thus, both transmitters are optimally adapted to the signal transmission along the interface. According to the configuration of the physical interface, this interface has lines for bidirectional signal transmission or unidirectional transmission paths. In the first case, the signals are transmitted in the form of voltage levels by means of one or more lines in two directions from the transmitter of one device to the receiver of the other device. In the second case, one or more lines are used merely for signal transmission in one direction from the transmitter of one device to the receiver of the other device. Based on the execution of the method for the transmitters of both devices, these can be consequently adapted optimally to the corresponding transmission configurations of the physical interface.

Advantageously, after adaptation of the parameters of both transmitters, a speed adaptation of the transmission rate between the two devices is performed. For this speed adaptation, the two devices negotiate a highest possible transmission rate that both devices can support in accordance with the protocol. A signal transmission can then be performed at the adapted transmission rate.

Advantageously, the method is performed after each change to the transmission paths of the physical interface or periodically at predetermined time points. This means that the transmitters of the two devices are re-parameterized each time the transmission properties of the physical interface change. This is the case, for example, when cables or plugs are used with other high-frequency properties. However, it is also conceivable to perform the method at predetermined time points, for example, before a new speed adaptation in accordance with the protocol.

In a second aspect, the problem is solved by an arrangement with a computer system and a peripheral device of the type named above, wherein the arrangement is designed to perform a method of the type named above.

BRIEF DESCRIPTION OF THE DRAWINGS

FIG. 2 shows a schematic diagram of individual components for adapting the parameters of a transmitter.

DETAILED DESCRIPTION OF THE DRAWINGS

Figure 1:
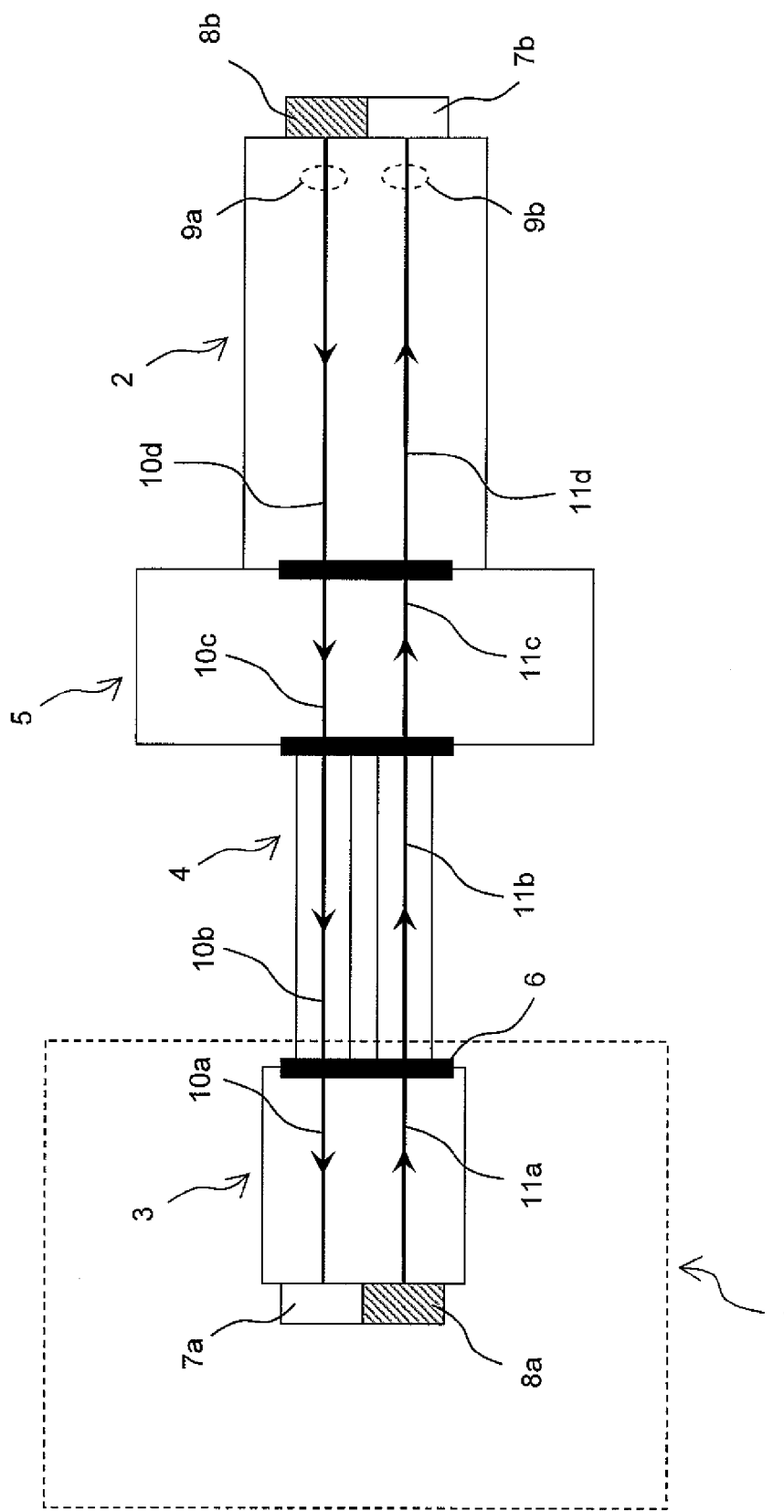
FIG. 1 shows a schematic diagram of an arrangement of a computer system with a peripheral device.

FIG. 1 shows a schematic diagram of an arrangement of a computer system 1 with a peripheral device 2. The two devices 1 and 2 are connected to each other by means of a physical interface for data exchange. The physical interface here consists of cables 4 and a backplane 5 that are connected by means of plugs 6 both to each other and also to a host-bus adapter 3 in the computer system 1 and to the peripheral device 2. The host-bus adapter 3 is used for preparing peripheral bus signals of the physical interface and for transmitting these signals to a system-internal host-bus or system bus (not shown), for example a PCI bus (PCI=peripheral component interconnect), which is integrated on a main circuit board of the computer system 1. The peripheral device 2 can be, for example, an internal hard disk that is connected via the backplane 5, the cable 4, as well as the host-bus adapter 3 to the main circuit board of the computer system 1 for data exchange. However, it is also conceivable that the peripheral device is an external device, for example, an external hard disk, a printer, or a Personal Digital Assistant (FDA).

For data transmission, two unidirectional transmission paths 9a and 9b are established between the host-bus adapter 3 of the computer system 1 and the peripheral device 2. The physical interface corresponds, for example, to the SAS, SATA, FC, or USB 3.0 standard. Thus, the transmission paths 9a and 9b each comprise two lines (not shown explicitly) that allow a differential signal transmission. Here, a voltage signal for coding the data is applied to one line and the inverted voltage signal is applied to the other line. A receiver can form a differential voltage from the signals on the two lines and thus receives a robust and error-free, as well as low-noise reception signal.

Furthermore, the host-bus adapter 3 and also the peripheral device 2 respectively have a transmitter 8a and 8b and a receiver 7a and 7b that are used for signal transmission. Here, a data stream flows from the transmitter 8b of the peripheral device 2 via the transmission path 9a to the receiver 7a of the host-bus adapter 3 in the computer system 1. Conversely, a data stream also flows in the other direction from the transmitter 8a of the host-bus adapter 3 via the transmission path 9b to the receiver 7b of the peripheral device 2. The corresponding transmission directions of the transmission paths 9a and 9b are designated by arrows. The two transmitters 8a and 8b are shown with cross-hatching. The transmitters 8a and 8b and also the receivers 7a and 7b of the two devices 1 and 2 are PHY components, that is, electronic circuits or integrated components for signal transmission between the two devices 1 and 2.

The transmission paths 9a and 9b are built from several sub-sections. Thus, there are sections on the strip conductors of circuit boards in the host-bus adapter 3 and in the peripheral device 2, sections on strip conductors of the backplane 5, and also sections in the lines of cables 4. Each of these sections can be described in its transmission characteristics by specific scattering parameters. All of the components, such as the system-side host-bus adapter 3, the peripheral device 2, the cables 4, and the backplane 5, can be measured with respect to scattering parameters for the transmission of high-frequency signals. Thus, the scattering parameters 10a, 10b, 10c, and 10d of the individual sections of the transmission path 9a and also the scattering parameters 11a, 11b, 11c, and 11d of the individual sections of the transmission path 9b can be determined.

If a transmitter 8a or 8b now sends an analog signal via the transmission path 9a or 9b to a corresponding receiver 7a or 7b, in that voltage signals are placed on the lines of the transmission path 9a or 9b according to a specified transmission protocol, then the individual sections of the transmission path 9a or 9b influence the signals by means of their scattering parameters 10a to 10d and 11a to 11d. The properties of these signals are changed or distorted on the way of the signals from a transmitter 8a or 8b to the corresponding receiver 7a or 7b.

This influence on the signals can result in an increased error rate, a lower transmission rate, or loss of information.

Therefore it is desirable to adapt the transmitters 8a and 8b optimally to the transmission paths 9a and 9b, so that the properties of the transmitted signals, for example, the rise time of a signal edge, the decay time, and also the pre-emphasis or the de-emphasis are changed accordingly and optimized to the signal transmission. This allows the receivers 7a and 7b to receive signals optimally adapted with reference to the individual paths 9a and 9b.

An adaptation of the parameters of the transmitters 8a and 8b can now be performed as follows. Initially, the host-bus adapter 3 determines the scattering parameters 10a to 10c of the transmission path 9a. This can be performed, for example, during the initialization phase of the host-bus adapter 3 during the booting of the computer system 1. Here, the scattering parameters 10a to 10c are read out, for example, from configuration registers of the host-bus adapter 3 or from addressable and readable memory locations in the computer system 1 in which they were previously stored on the side of the system. Thus, the computer system 1 has knowledge on the scattering parameters 10a of the system-specific host-bus adapter 3 and also on the scattering parameters 10b and 10c of the cables 4 and the backplane 5 that were reported to the system, for example, by the manufacturer during the initial configuration.

The host-bus adapter 3 now transmits the scattering parameters 10a to 10c through its transmitter 8a via the transmission path 9b to the receiver 7b of the peripheral device 2. This takes place advantageously at the lowest transmission rate in accordance with the protocol, so that transmission errors can be ruled out. The peripheral device 2 can combine the scattering parameters 10a to 10c with its own, previously known scattering parameters 10d into a complete high-frequency description of the transmission path 9a and can determine from this a complete path description of the transmission path 9a. Through this process, the peripheral device 2 thus obtains knowledge on the sections of the transmission path 9a prepared on the side of the system and also on its transmission behavior and influence on the signal transmission. The peripheral device 2 finally calculates from this information optimal parameters of the transmitter 8b for all of the transmission rates supported by the peripheral device 2. When this process is complete, the peripheral device signals this to the computer system, for example, by transmitting a defined signal sequence. Then an analog signal can be transmitted from the transmitter 8b of the peripheral device 2 via the transmission path 9a to the receiver 7a of the computer system 1, wherein the properties of the signals are adapted to the transmission path 9a according to the scattering parameters 10a to 10d.

In the reverse way, the adaptation of the transmitter 8a of the host-bus adapter 3 takes place in the computer system 1. The peripheral device 2 detects the scattering parameters 11d that are known to the peripheral device 2 and that can be likewise stored in a configuration register or in an addressable and readable memory location in the peripheral device 2. Then the peripheral device 2 transmits the scattering parameters 11d through its transmitter 8b via the optimized transmission path 9a to the receiver 7a of the host-bus adapter 3. Furthermore, from the obtained information, a high-frequency description of the complete transmission path 9b is calculated from the scattering parameters 11a to 11d now known to the computer system 1. After this process, the computer system 1 with its host-bus adapter 3 has obtained complete knowledge on the transmission behavior of the transmission path 9b and can adapt the parameters of the transmitter 8a such that signal properties of analog signals of the transmitter 8a are adapted optimally to the transmission path 9b. Thus, both transmitters 8b and 8a of the computer system 1 and the peripheral device 2 are adapted optimally to the corresponding transmission path 9a or 9b, so that an error-free and low-noise signal transmission between the computer system 1 and the peripheral device 2 is guaranteed.

It is conceivable that the corresponding receivers 7a and 7b are also adapted in their parameters to the correspondingly transmitted analog signals with their corresponding signal properties. The receivers 7a and 7b could give feedback to the corresponding transmitter 8a or 8b, for example, after receiving the signals of the transmitters 8a and 8b, wherein the signal amplitude in the transmitters 8a and 8b is changed according to the settings of the receivers 7a and 7b.

Furthermore, it is possible to initially adapt the transmitter 8a of the host-bus adapter 3 in the computer system 1 according to the previously mentioned method and then to parameterize the transmitter 8b of the peripheral device 2.

Furthermore, it is conceivable to perform the previously mentioned method if properties of the physical interface are changed, such as, for example, a changed shielding or a changed cable length. However, it is also possible to perform the method periodically at regular, predetermined time points, for example, after booting the computer system 1 and the first addressing and response of the peripheral device 2. It is also possible to consider the plug connections 6 in the detection of a high-frequency description of the transmission paths 9a and 9b with reference to the corresponding scattering parameters 10a to 10d and 11a to 11d.

FIG. 2 shows a schematic diagram of components and their logical linking for adapting parameters of a transmitter 8a or 8b according to FIG. 1. Scattering parameters, such as, for example, the parameters 10a to 10d and 11a to 11d according to FIG. 1 are first stored in a register 12. From this register 12, the scattering parameters can be loaded into a processing unit 13 for calculating a high-frequency description. By means of predetermined algorithms, the processing unit 13 finally calculates the overall transmission characteristics of each path 9a or 9b from the individual scattering parameters that represent, for example, scattering parameters for describing the transmission paths 9a and 9b according to FIG. 1.

This high-frequency description is finally transmitted to an adaptation unit 14 that changes the parameters of the transmitter with the help of other parameters from another register 15. The other parameters from the other register 15 can be, for example, additional information according to the transmission protocol being used or, for example, parameters for adapting each receiver 7a or 7b to the corresponding transmitter 8a or 8b according to FIG. 1. The newly calculated and changed parameters of the transmitter are transmitted to a setting register 16 that is coupled directly to the transmitter PHY component 17. This means that the newly set parameters of the transmitter are available immediately for the next signal transmission. A signal transmission on the transmission paths 9a or 9b takes place in FIG. 2 on two differential lines of a corresponding transmission path 9a or 9b, with these lines being designated by + and −. An analog signal of one transmitter 8a or 8b according to FIG. 1 that was, according to FIG. 2, parameterized accordingly is therefore transmitted unchanged on the + line and inverted on the − line. The two lines + and − according to FIG. 2 ultimately form a transmission path 9a or 9b.

An adaptation of the parameters of a transmitter by means of individual processing steps in several registers 12, 13, 15 and also in the logic units 14 and 16 can be implemented directly in a transmitter 8a or 8b or else also in separate logic units in the computer system 1 or in the peripheral device 2 according to FIG. 1.

In not-shown embodiments, the physical interface between a computer system 1 and a peripheral device 2 could also be formed from a bidirectional transmission path. Here, the transmitters 8a and 8b and also the receivers 7a and 7b can each be connected in parallel to the single transmission path, so that analog signals are transmitted via this transmission path either from the computer system 1 to the peripheral device 2 or from the peripheral device 2 to the computer system 1. Such a configuration is known, for example, from the USB 2.0 standard.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

I claim:

1. A method for adapting signal transmission between two devices that are connected to each other via a physical interface and that each have a transmitter and a receiver, wherein signals are transmitted from a transmitter of one device along a transmission path to a receiver of the other device, comprising the steps of:

retrieval by the first device of scattering parameters known to the first device for describing the electromagnetic wave propagation in the transmission path between the receiver of the first device and the transmitter of the second device;

transmission of the scattering parameters to the second device;

determination by the second device of a high-frequency description of the transmission path between the receiver of the first device and the transmitter of the second device as a function of scattering parameters known to the two devices; and adaptation of parameters of the transmitter in the second device as a function of the high-frequency description of the transmission path.

2. The method according to claim 1 wherein the scattering parameters known to the first device are transmitted via the transmission path between the transmitter of the first device and the receiver of the second device.

3. The method according to claim 1, wherein the scattering parameters known to the first device are transmitted to the second device at the lowest transmission rate of the interface.

4. The method according to claim 1, wherein the adaptation of parameters of the transmitter in the second device is performed separately for all transmission rates of the interface.

5. The method according to claim 1, wherein all of the scattering parameters known to the two devices are stored in a register in the second device.

6. The method according to claim 5, wherein the scattering parameters stored in the register are used for determining the high-frequency description and are processed in a processing unit in the second device into the high-frequency description.

7. The method according to claim 6, wherein, for adapting the parameters of the transmitter, the high-frequency description is transmitted from the processing unit to an adaptation unit in the second device, which calculates the parameters of the transmitter as a function of the high-frequency description.

8. The method according to claim 7, wherein the calculated parameters of the transmitter are stored in a setting register in the second device.

9. The method according to claim 8, wherein the transmitter is adapted for the signal transmission by means of the parameters from the setting register.

10. The method according to claim 1, wherein the method is performed not only for the transmitter in the second device, but also for the transmitter in the first device.

11. The method according to claim 10, wherein after adaptation of the parameters of both transmitters, a speed adaptation of the transmission rate between the two devices is performed.

12. The method according to claim 1, wherein the method is performed after each change of the transmission paths of the physical interface or periodically at predetermined time points.

13. An arrangement with a computer system and a peripheral device, wherein the peripheral device is connected to the computer system by a physical interface and wherein the computer system and the peripheral device each include a transmitter and a receiver for signal transmission between the computer system and the peripheral device, wherein the arrangement is configured to perform a method according to claim 1.

14. The arrangement according to claim 13, wherein the computer system includes a host-bus adapter to which the peripheral device is connected.

15. The arrangement according to claim 13, wherein the peripheral device is a hard disk.

* * * * *